US008768333B2

(12) United States Patent
Miyazaki et al.

(10) Patent No.: US 8,768,333 B2
(45) Date of Patent: Jul. 1, 2014

(54) COMMUNICATION APPARATUS AND CONNECTION METHOD

(75) Inventors: Shinichi Miyazaki, Kawasaki (JP); Tatsushi Kanemoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 525 days.

(21) Appl. No.: 12/551,739

(22) Filed: Sep. 1, 2009

(65) Prior Publication Data
US 2010/0081425 A1    Apr. 1, 2010

(30) Foreign Application Priority Data

Sep. 29, 2008   (JP) .................................. 2008-251141

(51) Int. Cl.
*H04W 4/00*    (2009.01)

(52) U.S. Cl.
USPC ..... 455/422.1; 370/230; 370/252; 370/310.2; 370/328; 370/338; 455/410; 455/411; 455/435.1; 455/435.2; 455/561

(58) Field of Classification Search
USPC .............. 455/403, 411, 422.1, 558, 561, 410, 455/424, 425, 435.1, 435.2, 443, 444, 448, 455/449, 456.5; 370/230, 252, 310, 310.2, 370/328, 338, 401
See application file for complete search history.

(56) References Cited

U.S. PATENT DOCUMENTS

| 2004/0105439 | A1  | 6/2004 | Kitami et al. |
| 2007/0105527 | A1* | 5/2007 | Nylander et al. ............. 455/403 |
| 2008/0254807 | A1  | 10/2008 | Duplessis et al. |
| 2009/0227234 | A1* | 9/2009 | Bosch et al. ................. 455/411 |
| 2012/0238324 | A1  | 9/2012 | Keevill et al. |

FOREIGN PATENT DOCUMENTS

| JP | 9-018963   | 1/1997 |
| JP | 2003-274011 | 9/2003 |
| JP | 2004-180121 | 6/2004 |
| JP | 2006-217443 | 8/2006 |
| JP | 2007-251564 | 9/2007 |
| WO | 2007015066 | 2/2007 |
| WO | 2007057732 | 5/2007 |

OTHER PUBLICATIONS

Notification of Reasons for Refusal issued for corresponding Japanese Patent Application No. 2008-251141, dispatched Nov. 27, 2012, with English translation.

* cited by examiner

*Primary Examiner* — Dinh P Nguyen
(74) *Attorney, Agent, or Firm* — Myers Wolin, LLC

(57) ABSTRACT

A communication apparatus for communicating by radio with mobile stations located in a radio communication area of the communication apparatus and for connecting to a network of a communication carrier, the communication apparatus includes obtainment means for obtaining information on a selection equipment for selecting a control equipment on a basis of data stored in a detachable data storage device in case of the data storage device being connected to the communication apparatus, reception means for receiving information on the control equipment selected from a plurality of control equipments by the selection equipment accessed from the communication apparatus on a basis of the obtained information on the selection equipment, from the selection equipment, and connection means for performing communication by radio to the mobile station with the selected control equipment on a basis of the received information on the control equipment.

11 Claims, 13 Drawing Sheets

BS: Base Station
BCE: Base Station Control Equipment
BRS: Base Station Registration Server BS: Base Station
BCE: Base Station Control Equipment
BRS: Base Station Registration Server

FIG. 5

| FEMTOCELL BASE STATION NUMBER | FEMTOCELL BASE STATION EQUIPMENT NUMBER | SUBSCRIBER AUTHENTICATION INFORMATION |
|---|---|---|
| X | F1001 | ○○○○ |
| Y | F2001 | ○○○○ |
| ... | ... | ... |

FIG. 6

| POSITION INFORMATION | BASE STATION CONTROL | EQUIPMENT NUMBER |
|---|---|---|
| AAAA | CANDIDATE 1 | XY |
|  | CANDIDATE 2 | YY |
| AAAB | CANDIDATE 1 | XY |
|  | CANDIDATE 2 | YZ |
| AABB | CANDIDATE 1 | YZ |
|  | CANDIDATE 2 | YA |
| ABBB | CANDIDATE 1 | QY |
|  | CANDIDATE 2 | QQ |
| BBBB | CANDIDATE 1 | QK |
|  | CANDIDATE 2 | KK |
| BBBA | CANDIDATE 1 | DF |
|  | CANDIDATE 2 | FD |

FIG. 7

| BCE NUMBER | BCE INFORMATION | AREA INFORMATION FOR ACCOMMODATING BCE | ACCOMMODATION INFORMATION ON FEMTOCELL BASE STATION |
|---|---|---|---|
| XX | aaa.bbb.ccc | AAAB | 5 |
| YZ | ddd.aaa.ccc | AAAC | 5 |
| ... | ... | ... | ... |

BCE: BASE STATION CONTROL EQUIPMENT

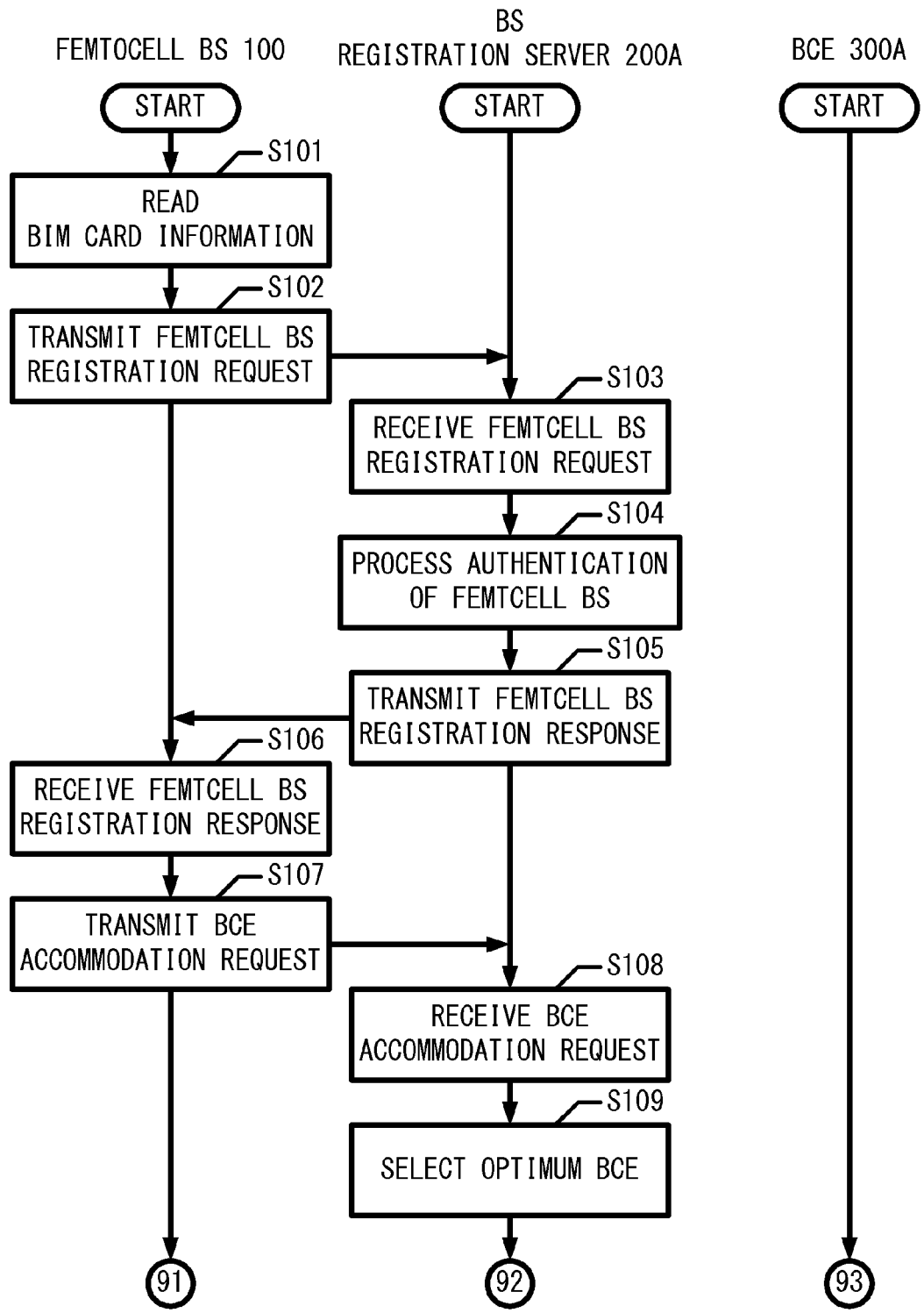

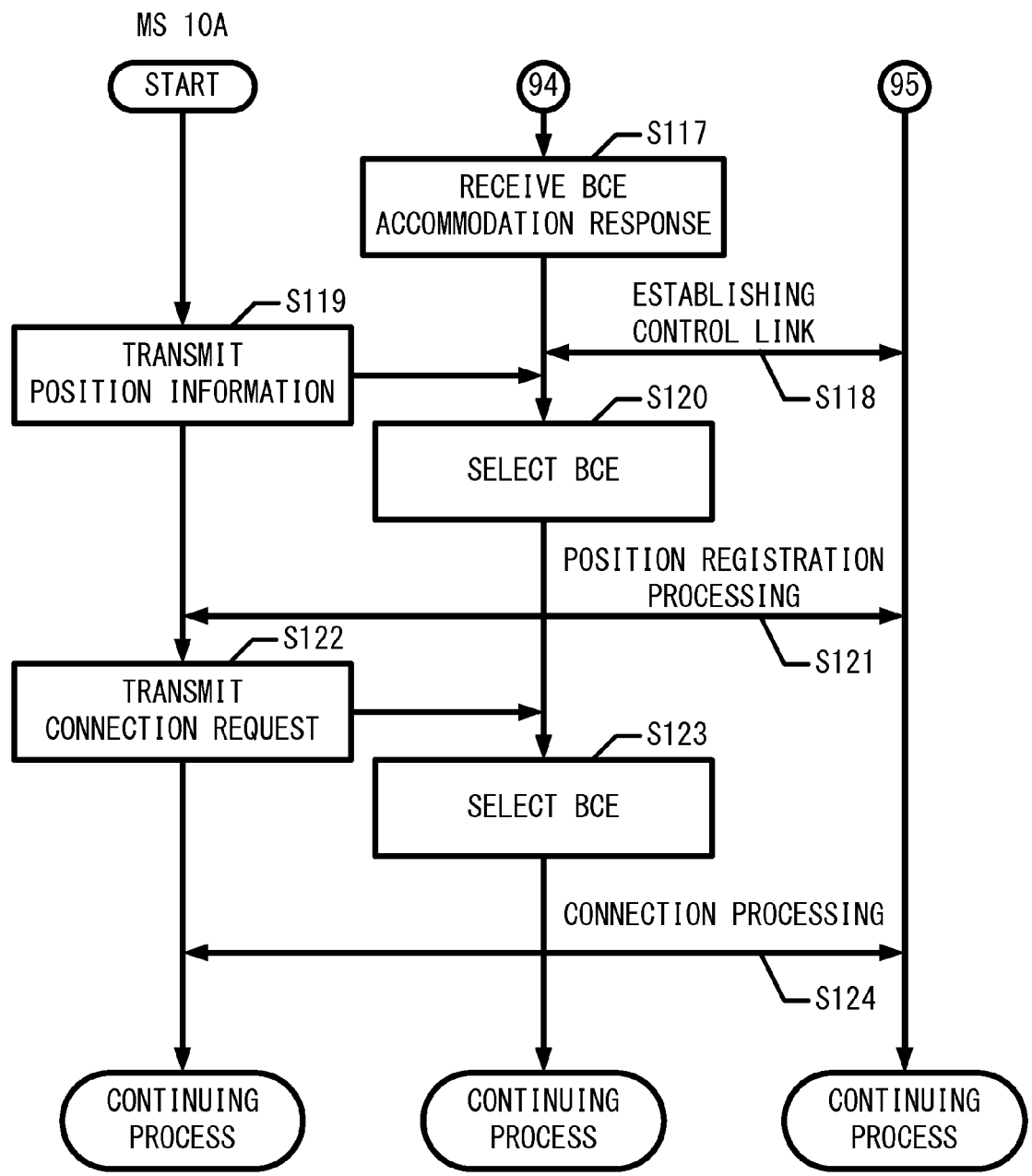

COMMUNICATION APPARATUS AND CONNECTION METHOD

CROSS-REFERENCE TO RELATED APPLICATIONS

This application is based upon and claims the benefit of priority of the prior Japanese Patent Application No. 2008-251141, filed on Sep. 29, 2008, the entire contents of which are incorporated herein by reference.

FIELD

The embodiment discussed herein is related to communication apparatus and connection method. The communication apparatus and connection method may be applied, for example, to a communication system using a femtocell base station.

BACKGROUND

Recently, facilities of a subminiature base station (femtocell base station) according to a femtocell system are developed. Further, it is technically possible to establish a base station that can be connected to the Ethernet line or a broadband line. An amendment to relevant bills is prepared in Japan. If amending the relevant bills, a user in a general household can purchase a femtocell base station by electronics retail stores and the femtocell base station can be set at an arbitrary place of a home or office, thereby using it.

The following technique is disclosed in Japanese Laid-open Patent Publication No. 2006-217443. In the case that a call request was received from a mobile station, a location area of a transmission destination is specified by a general phone number of the transmission destination, a distance segment from the mobile station of a transmitting source to the mobile station of the transmission destination is obtained from charging information for calculating call charges, a call charge unit in a communication system of each phone number of the transmission destination is calculated on the basis of the distance segment, the current time, and subscription condition information and the lowest call charge system is selected from among the call charge unit.

The following technique is disclosed in Japanese Laid-open Patent Publication No. 9-18963. At the outgoing call from a PHS terminal, subscriber identification information to be sent from the PHS station is transmitted to a PHS management center with a D-channel packet on an I' line and is then authenticated at a PHS base station. And, after obtaining the authentication result, the call from the PHS terminal is transmitted via an analog line or the I' line at the PHS base station, thereby selecting a communication carrier with the lowest costs.

Since it is assumed that a communication service is provided on the unit basis of a communication carrier over a system having the conventional femtocell base station, a user of the femtocell base station cannot select a connection to a core network of an arbitrary communication carrier from the femtocell base station.

Therefore, when differing communication carriers subscribed by the user of the femtocell base station in each general household or office, the femtocell base station can be used only a user having a terminal of a communication carrier dependent on the set femtocell base station. When the user changes the communication carrier, the user cannot apply the femtocell base station of the communication carrier before the change thereof.

SUMMARY

According to an aspect of an embodiment, there is provided a communication apparatus for communicating by radio with mobile stations located in a radio communication area of the communication apparatus and for connecting to a network of a communication carrier, the communication apparatus including obtainment means for obtaining information on a selection equipment for selecting a control equipment on a basis of data stored in a detachable data storage device in case of the data storage device being connected to the communication apparatus, reception means for receiving information on the control equipment selected from a plurality of control equipments by the selection equipment accessed from the communication apparatus on a basis of the obtained information on the selection equipment, from the selection equipment, and connection means for performing communication by radio to the mobile station with the selected control equipment on a basis of the received information on the control equipment.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a data structure of femtocell base station authentication management information;

FIG. 6 is a diagram illustrating an example of a data structure of base station control equipment selection information;

FIG. 7 is a diagram illustrating an example of a data structure of base station control equipment accommodation information;

FIGS. 9A-9C are flowcharts illustrating a processing sequence of a communication system;

DESCRIPTION OF EMBODIMENT

With reference to drawings, an embodiment of the present invention will be described in detail below.

Embodiment

Figure 1:
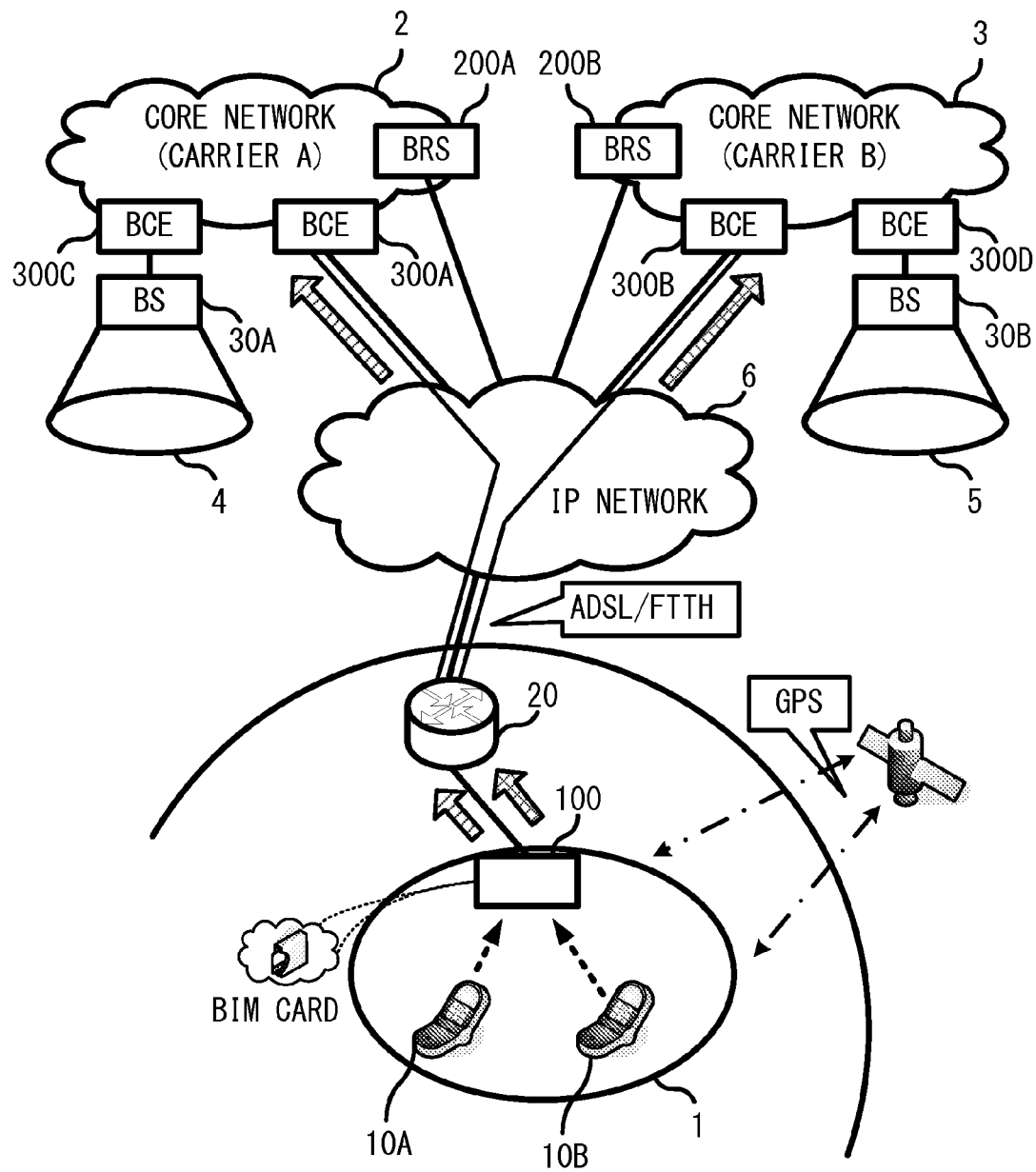
FIG. 1 is a diagram illustrating a structure example of a communication system.

FIG. 1 is a diagram illustrating an example of a structure of a communication system. A router 20 and a femtocell base station 100 are disposed at a house, and mobile stations 10A and 10B located in a femtocell (a radio communication area) 1 of the femtocell base station 100.

The router 20 is in a connectable state to a mobile phone core network 2 of a carrier A and a mobile phone core network 3 of a carrier B via an IP network 6. The mobile phone core network 2 of the carrier A has a base station registration server (BRS) 200A and base station control equipment (BCE) 300A and 300C. The mobile phone core network 3 of the carrier B has a base station registration server (BRS) 200B and base station control equipment (BCE) 300B and 300D. Reference numerals 200, 300, 30 and 10 are generically used for the base station registration server (BRS), base station control equipment (BCE), base station (BS) and the mobile station (MS), respectively.

The femtocell base station 100 is a communication apparatus that connects the mobile station 10 in the radio communication area 1, that is a femtocell, to the network. For example, upon connecting the mobile stations 10A and 10B in a femtocell to the network, the femtocell base station 100 sets, to be available for the mobile stations 10A and 10B, the mobile phone core network of a carrier corresponding to a card (refer to BIM (Base station Identity Module) card here) inserted to a card slot, on the basis of information stored in the BIM card. The BIM card is a detachable card (e.g., IC (Integrated Circuit) card) that stores information (e.g., information for identifying the carrier of the user as a subscriber) required for connecting to the core network of the carrier of the user as a subscriber.

When the BIM card corresponds to the mobile phone core network 2 of a carrier A (when the user of the mobile station 10A subscribes to the carrier A), identification information of the carrier A is stored in the BIM card. Thus, the BIM card is inserted to any one of card slots in the femtocell base station 100 and the mobile station 10A uses the mobile phone core network 2 of the carrier A and can be thereby connected to the network via the femtocell base station 100.

The base station registration servers 200A and 200B are selection equipments that determine whether or not base station control equipment 300 accommodates the femtocell base station 100, on the basis of position information of the femtocell base station 100. The position of femtocell base station 100 is measured by a GPS (Global Positioning System).

When the base station control equipment 300A and 300B is determined as the base station control equipment 300 that accommodates the femtocell base station 100 by the base station registration servers 200A and 200B, the base station control equipment 300A and 300B are control equipments that controls the femtocell base station 100 and communicates with the mobile stations 10A and 10B in the femtocell.

The base station control equipment 300C is a control equipment that controls a base station 30A connected to the base station control equipment 300C and communicates with mobile stations located in a macro cell (a radio communication area) 4. The base station control equipment 300D controls a base station 30B connected to the base station control equipment 300D and communicates with mobile stations located in a macro cell (a radio communication area) 5.

Next, a description will be given to data (BIM card information) to be stored in the BIM card.

Figure 2:
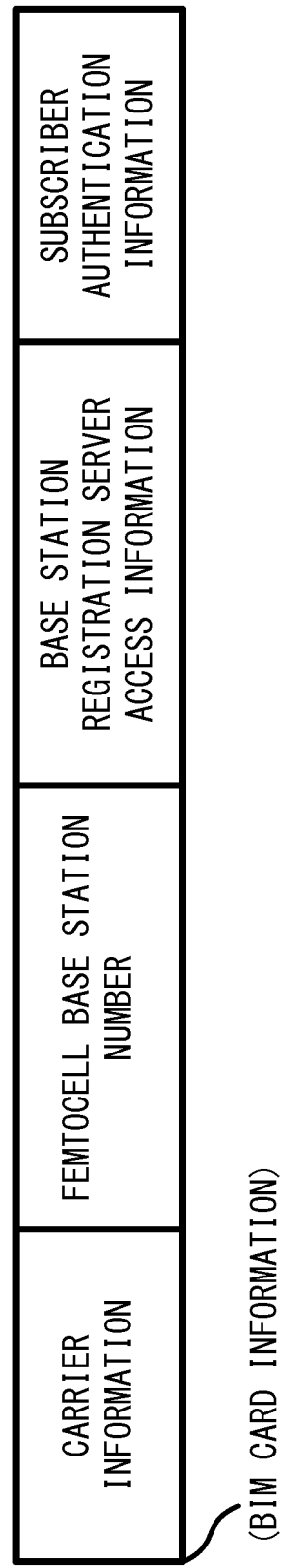
FIG. 2 is a diagram illustrating an example of a data structure of BIM card information.

FIG. 2 is a diagram illustrating an example of a data structure of the BIM card information. The BIM card information includes communication carrier information, a femtocell base station number, base station registration server access information, and subscriber authentication information. If a mobile station 10 can connect to the core network of the corresponding carrier through the femtocell base station, all the information may be not always stored in the BIM card.

The communication carrier information specifies a communication carrier as a connection destination. For example, information of the carrier A or carrier B is stored in the area of the communication carrier information.

The femtocell base station number is an identification number for arbitrary identifying the femtocell base station in the communication carriers. The number may be given by the BIM card unit. The femtocell base station number can be used at the time of a negotiation between the femtocell base station 100 and the core network.

The base station registration server access information is information for accessing the base station registration server of the communication carrier of the connection destination. For example, the base station registration server access information is set as an IP address of the base station registration server as the connection destination.

The subscriber authentication information is authentication information for ensuring that the user permitted to the connection is a regular subscriber. For example, the subscriber identification information is set as an ID (Identification) and a password.

Next, a description will be given to a structure of the femtocell base station 100 illustrated in FIG. 1.

Figure 3:
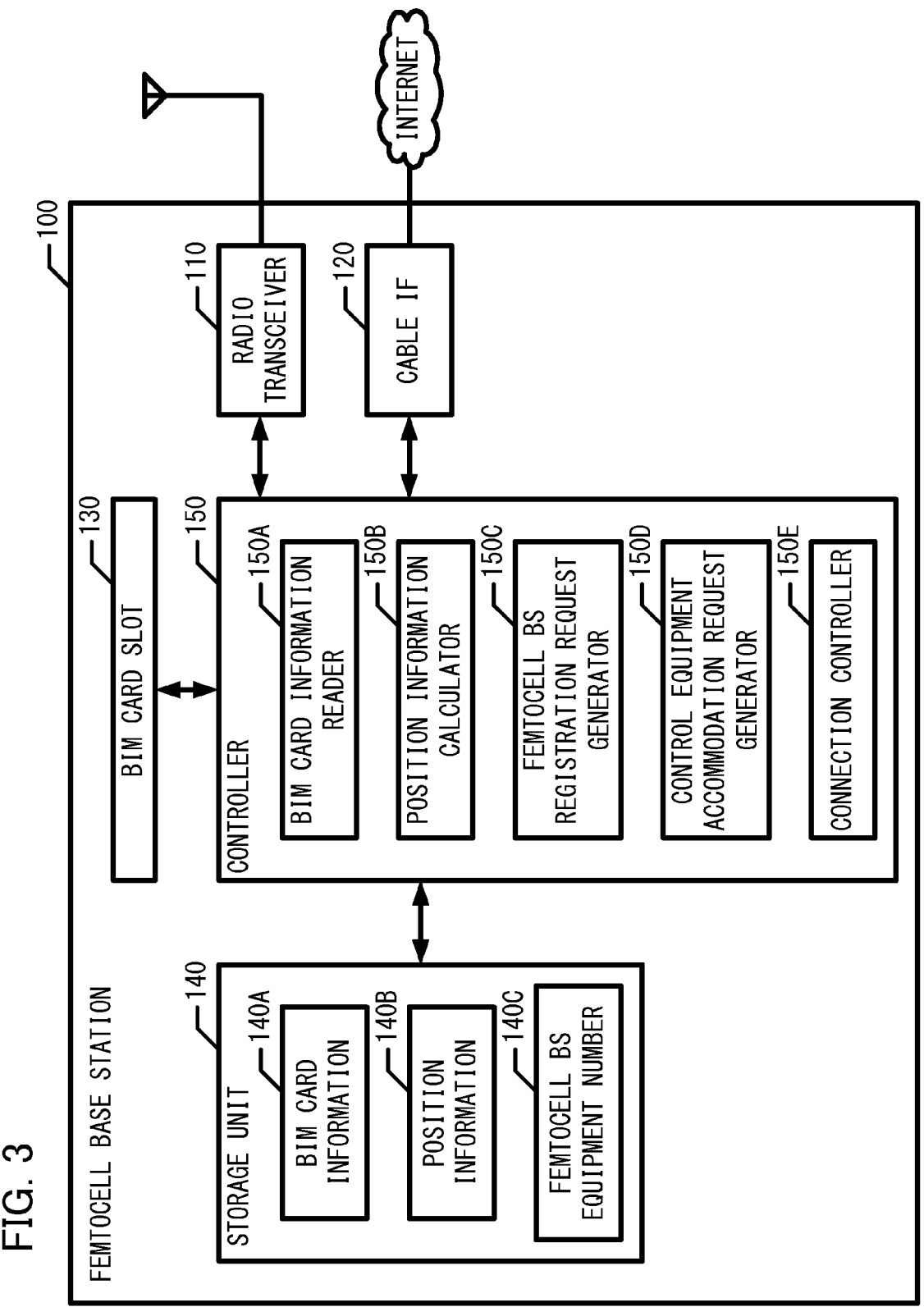
FIG. 3 is a functional block diagram illustrating the structure of a femtocell base station.

FIG. 3 is a functional block diagram illustrating a structure of the femtocell base station 100. The femtocell base station 100 has a radio transceiver 110, a cable IF 120, a BIM card slot 130, a storage unit 140, and a controller 150.

The radio transceiver 110 has a function compatible with a plurality of radio systems. For example, the radio transceiver 110 executes radio communication processing to the mobile stations 10A-10B in the femtocell as illustrated in FIG. 1. Further, the radio transceiver 110 executes the radio communication processing to satellites.

The cable IF 120 has a function for enabling a cable connection to a broadband line (a user's subscribing line). For example, the cable IF 120 performs data communication processing to the base station registration servers 200A-200B and the base station control equipment 300A-300B as illustrated in FIG. 1.

The BIM card slot 130 is a slot (preferably, a multi-slot) detachable from/to one or a plurality of BIM cards. When the BIM card is inserted to the BIM card slot 130, the femtocell base station 100 accesses the BIM card information stored in the BIM card.

The storage unit 140 stores BIM card information 140A, position information 140B and a femtocell base station equipment number 140C.

The BIM card information 140A corresponds to the BIM card information stored in the BIM card inserted to the BIM slot card 130. The data structure of the BIM card information 140A is similar to that of the BIM card information illustrated in FIG. 2.

The position information 140B is information on position coordinate of the femtocell base station 100.

The femtocell base station equipment number 140C is an identification number for ensuring the uniqueness of equipment that is the femtocell base station 100 in itself. For example, the femtocell base station equipment number 140C is a MAC (Media Access Control) address.

The controller 150 controls the entire femtocell base station 100, and includes a BIM card information reader 150A, a position information calculator 150B, a femtocell base station (BS) registration request generator 150C, a control equipment accommodation request generator 150D and a connection controller 150E.

The BIM card information reader 150A reads BIM card information stored in the BIM card upon inserting the BIM card to the BIM card slot 130, and stores the read information to the storage unit 140. Incidentally, upon inserting a plurality of BIM cards, the BIM card information may be individually read out and be stored to the storage unit 140.

The position information calculator 150B receives radio waves from a plurality of satellites (not illustrated) and calculates the distance to the individual satellites similarly to the well-known GPS, thereby calculating the position coordinate of the femtocell base station 100. The position information calculator 150B stores the calculated position coordinate as the position information 140B to the storage unit 140.

The femtocell base station registration request generator 150C specifies the base station registration server 200 of the communication carrier as the connection destination from information on the communication carrier and access information on the base station registration server 200, included in the BIM card information 140A, and performs a registration request of the femtocell base station 100 to the specified base station registration server 200.

The femtocell base station registration request generator 150C transmits authentication information to the base station registration server 200 upon issuing the registration request to the base station registration server 200. The authentication information has the femtocell base station equipment number 140C, a femtocell base station number of the BIM card information 140A, and subscriber authentication information. Incidentally, the authentication processing may be omitted.

The control equipment accommodation request generator 150D transmits the position information 140B of the femtocell base station 100 to the base station registration server 200 upon receiving a registration response of the femtocell base station (a femtocell base station registration response) from the base station registration server 200 so as to issue a request for accommodating a control equipment (a control equipment accommodation request) to the base station registration server 200.

The control equipment accommodation request generator 150D establishes a control link with the base station control equipment 300 selected by the base station registration server 200 upon receiving the control station accommodation response from the base station registration server 200. An operation for establishing the control link 200 is similar to the existing one.

A connection controller 150E determines whether or not a mobile station 10 is a connectable one, on the basis of carrier information of the mobile station 10 and the BIM card information 140A, upon receiving the connection request from the mobile station 10 in the femtocell 1. When the mobile station 10 is a connectable one (e.g., the carrier information of the mobile station 10 matches the information on the communication carrier of the BIM card information 140A), the connection controller 150E controls the connection between the base station control equipment 300 and the mobile station 10. For example, the carrier information of the mobile station 10 may be obtained from the mobile station 10.

The connection controller 150E compares the subscriber authentication information with the BIM card information 140A to select the base station control equipment as the connection destination and controls data communication between the selected base station control equipment 300 and the mobile station 10. Although the matching may be detected in the comparison processing, it may be determined whether or not radio services are provided to the mobile station 10, on executing a predetermined authentication algorithm with the subscriber authentication information. For example, the subscriber authentication information of the mobile station 10 may be obtained from the mobile station 10.

Next, a description will be given of the structure of the base station registration server 200.

Figure 4:
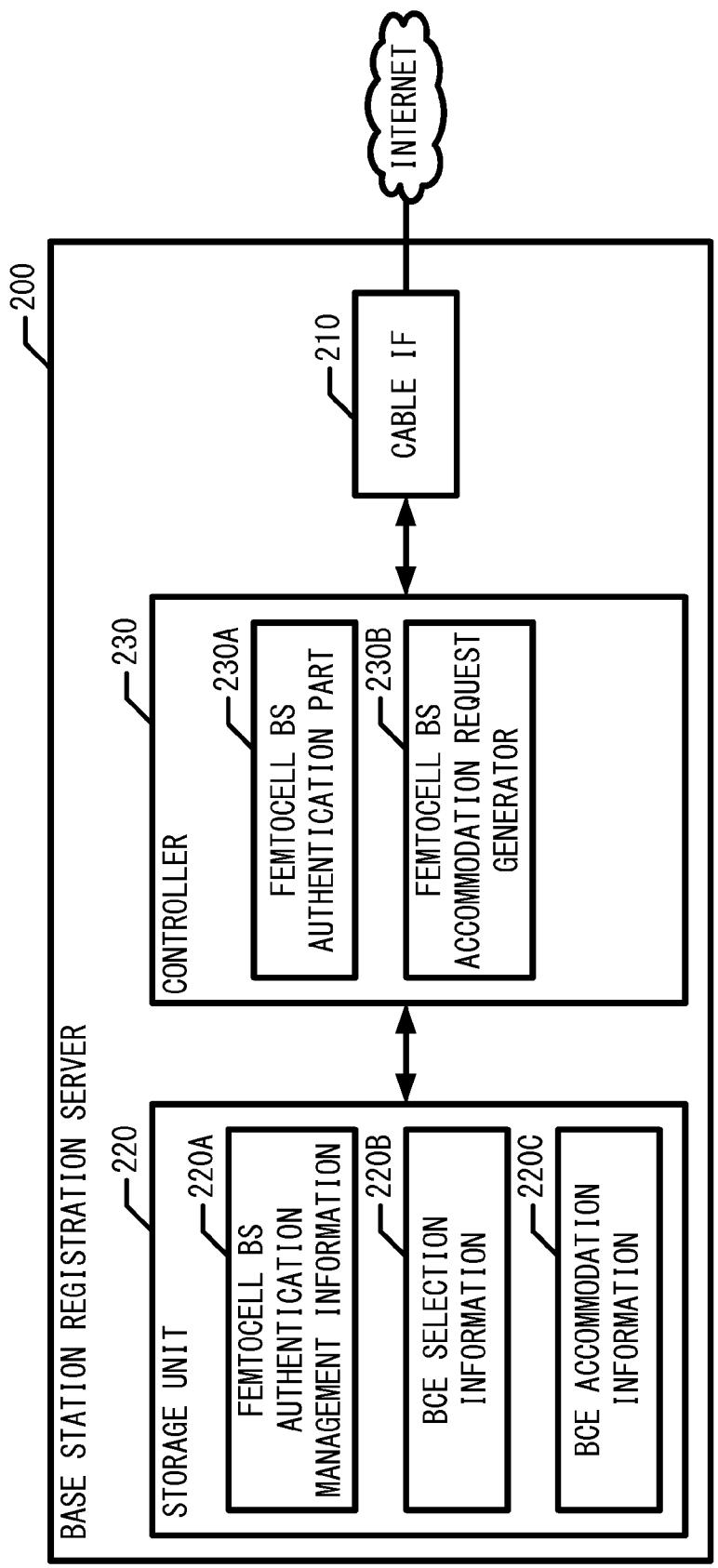
FIG. 4 is a functional block diagram illustrating the structure of a base station registration server.

FIG. 4 is a functional block diagram illustrating the structure of the base station registration server 200. The base station registration server 200 includes a cable IF 210, a storage unit 220, and a controller 230.

The cable IF 210 has a function for enabling a cable connection to a broadband line (user subscribing line), and performs data communication processing with the femtocell base station 100 illustrated in FIG. 1.

The storage unit 220 stores femtocell base station (BS) authentication management information 220A, base station control equipment (BCE) selection information 220B and base station control equipment (BCE) accommodation information 220C. The femtocell base station authentication management information 220A is information for authenticating the femtocell base station 100.

FIG. 5 is a diagram illustrating an example of the data structure of the femtocell base station authentication management information 220A.

The femtocell base station authentication management information 220A has a femtocell base station number, a femtocell base station equipment number and subscriber authentication information. The femtocell base station number is an identification number for uniquely identifying the femtocell base station 100 in the communication carrier, and is given on the unit bases of BIM card.

The femtocell base station equipment number is an identification number for ensuring the uniqueness of the femtocell base station 100 every carrier. For example, the femtocell base station equipment number is an MAC address. In an example illustrated in FIG. 5, the femtocell base station 100 with a femtocell base station number "X" corresponds to a femtocell base station with a femtocell base station equipment number "F1001".

The subscriber authentication information is authentication information for ensuring that the user permitted to the connection by the femtocell base station 100 is a regular subscriber. For example, the subscriber authentication information is user ID and password.

The base station control equipment selection information 220B is information indicating relevance between the position information of the femtocell base station 100 and the base station control equipment number of the base station control equipment 300 that accommodates the femtocell base station 100.

FIG. 6 is a diagram illustrating an example of the data structure of the base station control equipment selection information 220B.

The base station control equipment selection information 220B has position information of the femtocell base station 100 and a base station control equipment number of the base station control equipment 300.

The position information is information on the position coordinates of the femtocell base station 100. The base station control equipment number is a number for identifying the base station control equipment 300 as a candidate for accommodating the femtocell base station located in the area indicated by the position information.

The base station control equipment number has a candidate 1 and a candidate 2 with respect to the position information. When the base station control equipment 300 as the candidate 1 does not accommodate the femtocell base station 100, the base station control equipment 300 as the candidate 2 accommodates the femtocell base station 100.

For example, when the position information of the femtocell base station 100 is "AAAA", the base station control equipment number of the base station control equipment 300 as the candidate 1 is "XY" and the base station control equipment number of the base station control equipment 300 as the candidate 2 is "YY".

The base station control equipment accommodation information 220C is information on the base station control equipment 300 as a candidate for accommodating the femtocell base station 100.

FIG. 7 is a diagram illustrating an example of the data structure of the base station control equipment accommodation information 220C. The base station control equipment accommodation information 220C has a base station control equipment (BCE) number, base station control equipment (BCE) information, area information for accommodating the base station control equipment (BCE) and accommodation information on the femtocell base station.

The base station control equipment number is a number for identifying the base station control equipment 300.

The base station control equipment information is necessary for connection of the base station control equipment 300 corresponding to the base station control equipment number. For example, the base station control equipment information is an IP address of the base station control equipment 300.

The area information for accommodating the base station control equipment is position information of the femtocell base station 100 that can be accommodated by the base station control equipment 300 corresponding to the base station control equipment number.

The accommodation information on the femtocell base station is information indicating the number of femtocell base stations accommodated currently by the base station control equipment 300 corresponding to the base station control equipment number.

The controller 230 illustrated in FIG. 4 controls the entire base station registration server 200, and includes a femtocell base station (BS) authentication part 230A and a femtocell base station (BS) accommodation request generator 230B.

The femtocell base station authentication part 230A authenticates the femtocell base station 100 upon receiving the registration request of the femtocell base station from the femtocell base station 100. The femtocell base station registration request has a femtocell base station equipment number, a femtocell base station number, and subscriber authentication information.

When the femtocell base station authentication part 230A performs authentication processing, it is determined, by using the femtocell base station number included in the femtocell base station registration request as a key, whether or not the same femtocell base station number is registered in the femtocell base station authentication management information 220A.

When the same femtocell base station number is not registered in the femtocell base station authentication management information 220A, the femtocell base station authentication part 230A transmits information indicating that authentication fails to the femtocell base station 100.

On the other hand, when the same femtocell base station number is registered in the femtocell base station authentication management information 220A, the femtocell base station authentication part 230A obtains the subscriber authentication information corresponding to the femtocell base station number as a key from the femtocell base station authentication management information 220A, and compares the obtained subscribed authentication information with the subscriber authentication information included in the femtocell base station registration request.

When the user IDs and passwords do not match each other as a comparison result of both the subscriber authentication information, the femtocell base station authentication part 230A transmits information indicating that the authentication fails to the femtocell base station 100.

On the other hand, when the user IDs and passwords match each other as a comparison result of both the subscriber authentication information, the femtocell base station authentication part 230A transmits information indicating that the authentication is successful to the femtocell base station 100. Further, the femtocell base station authentication part 230A registers the femtocell base station equipment number included in the femtocell base station registration request 100 to the femtocell base station authentication management information 220A with correspondence to the femtocell base station number as a key.

Upon obtaining the control equipment accommodation request from the femtocell base station 100, the femtocell base station accommodation request generator 230B determines the base station control equipment 300 that accommodates the femtocell base station 100 on the basis of the position information of the femtocell base station 100 included in the control equipment accommodation request.

Specifically, the femtocell base station accommodation request generator 230B first compares the position information of the femtocell base station 100 with the base station control equipment selection information 220B, and specifies the base station control equipment number of the candidate 1. When the position information is "AAAB", the base station control equipment number is "XX", as illustrated in FIG. 6.

The femtocell base station accommodation request generator 230B compares the specified base station control equipment number with the information on the accommodation of the base station control equipment 300, and then issues a request for accommodating the femtocell base station (a femtocell base station accommodation request) to the base station control equipment 300. When the specified base station control equipment number is "XX", the femtocell base station accommodation request generator 230B hits the base station control equipment number "XX" of the base station control equipment accommodation information 220C (refer to FIG. 7). Therefore, the femtocell base station accommodation request is issued to the base station control equipment 300 at an IP address (aaa.bbb.ccc) corresponding to the base station control equipment number "XX".

When the base station control equipment 300 corresponding to the base station control equipment number of the candidate 1 does not accommodate the femtocell base station 100, the femtocell base station accommodation request generator 230B specifies the base station control equipment number of the candidate 2, and issues the femtocell base station accommodation request to the specified base station control equipment 300. Herein, the case in which the femtocell base station 100 is not accommodated means that the number of femtocell base stations accommodated by the specified base station control equipment 300 is over a predetermined value.

Upon specifying the base station control equipment 300 that accommodates the femtocell base station 100, the femtocell base station accommodation request generator 230B transmits, to the femtocell base station 100, information (e.g., identification information or IP address of the base station control equipment) on the specified base station control equipment 300, as a response for accommodating the control equipment (a control equipment accommodation response).

Next, a description will be given of the structure of the base station control equipment 300 illustrated in FIG. 1.

Figure 8:
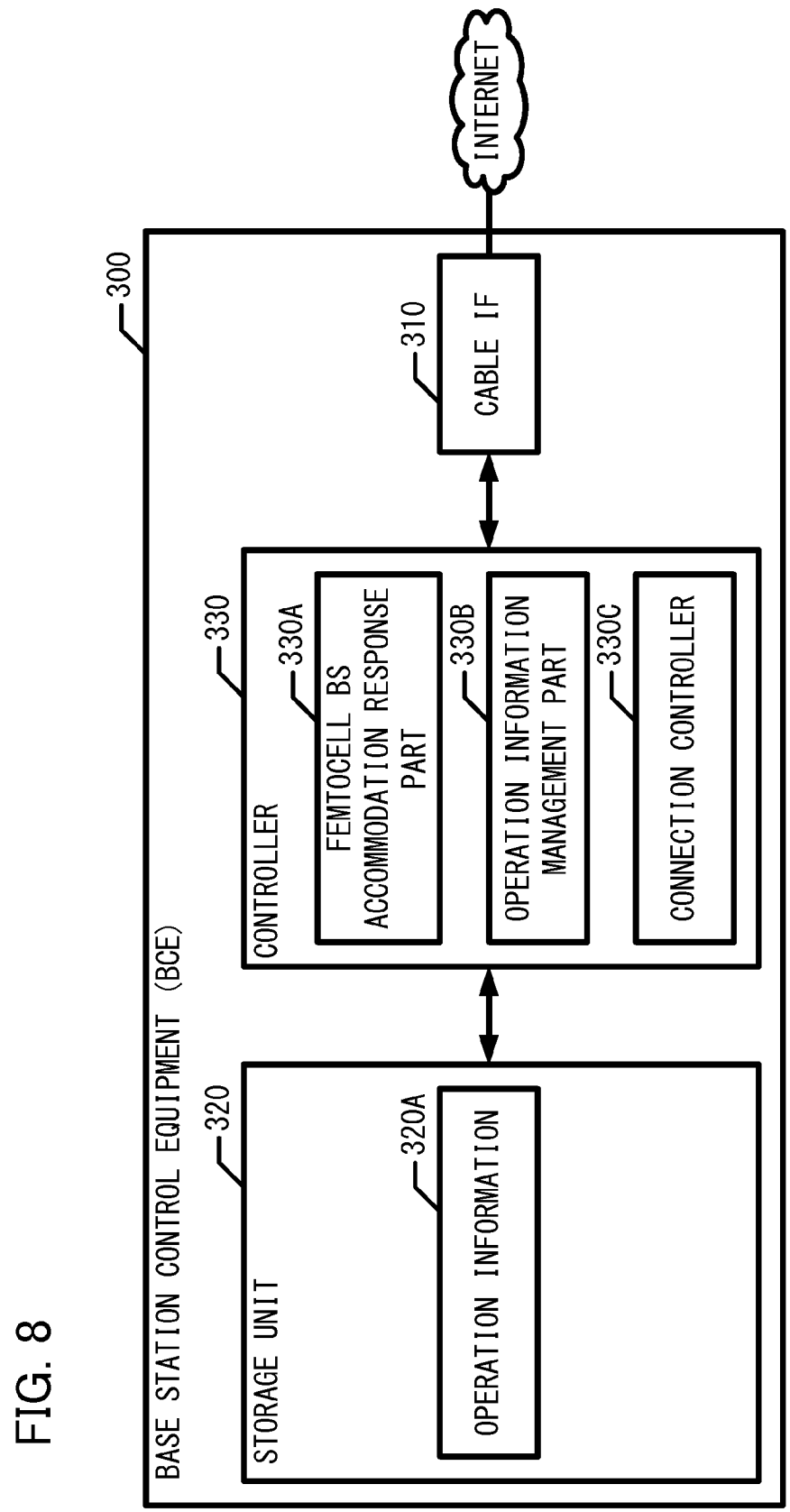
FIG. 8 is a functional block diagram illustrating the structure of base station control equipment.

FIG. 8 is a functional block diagram illustrating the structure of the base station control equipment 300. The base station control equipment 300 includes a cable IF 310, a storage unit 320 and a controller 330.

The cable IF 310 has a function for enabling a cable connection to a broadband line (user subscribing line), and performs data communication processing with the femtocell base station 100 and the base station registration server 200.

The storage unit 320 stores operation information 320A. The operation information 320A manages the base station 30 and the femtocell base station 100 accommodated by the base station control equipment 300.

The controller 330 controls the entire base station control equipment 300, and includes a femtocell base station (BS) accommodation response part 330A, an operation information management part 330B and a connection controller 330C.

Upon receiving a request for accommodating the femtocell base station (a femtocell base station accommodation request) from the base station registration server 200, the femtocell base station accommodation response part 330A determines whether or not the femtocell base station 100 is accommodated, and issues a response to the femtocell base station accommodation request.

Upon receiving the femtocell base station accommodation request, the femtocell base station accommodation response part 330A refers to the operation information 320A, and thereby determines whether or not the number of the base stations and femtocell base stations accommodated currently is a predetermined number or more.

When the number of the base stations 30 and femtocell base stations 100 accommodated currently is not a predetermined number or more, the femtocell base station accommodation response part 330A determines that the femtocell base station 100 is accommodated. When the number of the base stations 30 and femtocell base stations 100 accommodated currently is the predetermined number or more, it is determined that the femtocell base station 100 is not accommodated. It may be determined whether or not the femtocell base station 100 is accommodated, depending on a load for processing the base station control equipment 300 or on as whether or not the specification of the femtocell base station 100 corresponds to the base station control equipment 300.

The operation information management part 330B manages the operation information 320A. When it is determined that the femtocell base station accommodation response part 330A accommodates the femtocell base station 100, the operation information management part 330B registers information on the femtocell base station 100 that is determined to be accommodated to the operation information 320A.

The connection controller 330C establishes a control link with the accommodated femtocell base station 100. Further, the connection controller 330C performs data communication processing with the mobile station 10 through the femtocell base station 100.

Next, a description will be given of a processing sequence of a communication system.

Figure 9B:
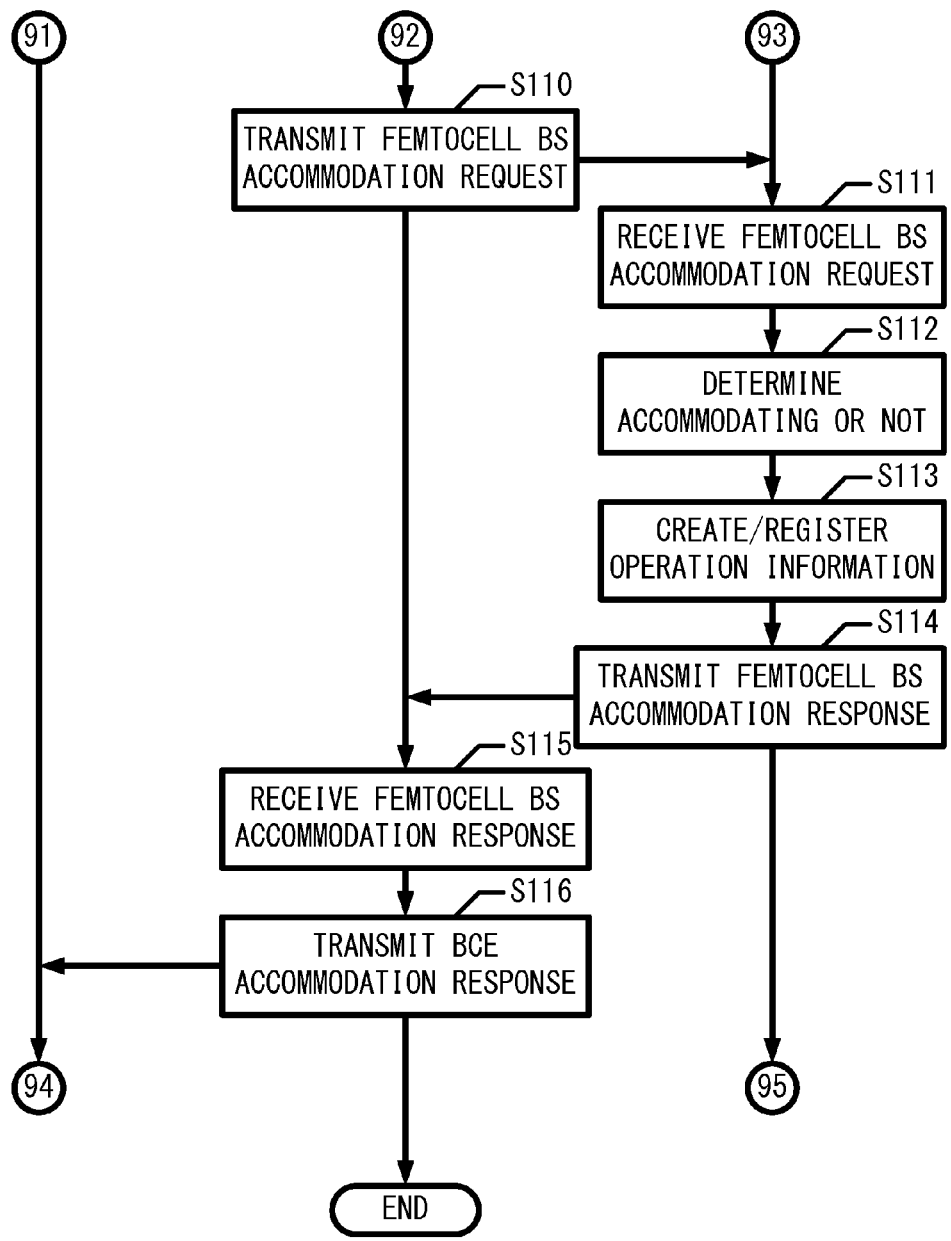

FIGS. 9A to 9C are flowcharts illustrating the processing sequence of the communication system. For example, this will be described with the mobile station 10A, femtocell base station 100, base station registration server 200A and base station control equipment 300A.

The femtocell base station 100 reads the BIM card information from the BIM card (in step S101).

The request for registering the femtocell base station (the femtocell base station registration request) is transmitted to the base station registration server 200 (in step S102).

The femtocell base station registration request includes the femtocell base station number, the subscriber authentication information, the base station registration server access information, and the femtocell base station equipment number. The BIM card stores the communication carrier information used for that the mobile station 10A is able to communicate, which will be described later with reference to FIG. 9C, the femtocell base station number, and the like.

The base station registration server 200A receives the request for registering the femtocell base station (in step S103), performs the authentication processing of the femtocell base station 100 (in step S104), and transmits the response for registering the femtocell base station (the femtocell base station registration response) to the femtocell base station 100 (in step S105).

The femtocell base station 100 receives the response for registering the femtocell base station (in step S106), and transmits the request for accommodating the control equipment (the control equipment (BCE) accommodation request) to the base station registration server 200A (in step S107).

The request for accommodating the control equipment includes the position information of the femtocell base station 100.

The base station registration server 200A receives the request for accommodating the control equipment (in step S108), selects the optimum base station control equipment 300 based on the position information (in step S109), and transmits the request for accommodating the femtocell base station (the femtocell base station accommodation request) to the selected base station control equipment 300A (in step S110).

In step S109, the base station registration sever 200A compares the base station control equipment selection information 220B with the position information (the position information is stored to the control equipment accommodation request) of the femtocell base station 100 that accommodates the mobile station 10, and specifies the base station control equipment number. By comparing the base station control equipment number with the base station control equipment accommodation information 220C, the optimum base station control equipment 300 is selected.

The base station control equipment 300A receives the request for accommodating the femtocell base station (in step S111), determines whether or not the femtocell base station 100 is accommodated (in step S112), and creates and registers the operation information in accordance with the determination result (in step S113).

The base station control equipment 300A transmits the response for accommodating the femtocell base station (the femtocell base station accommodation response) to the base station registration server 200A (in step S114).

The base station registration server 200A receives the response for accommodating the femtocell base station (in step S115), and transmits the response for accommodating the control equipment (control equipment (BCE) accommodation response) to the femtocell base station 100 (in step S116).

Next, referring to FIG. 9C, the femtocell base station 100 receives the response for accommodating control equipment (in step S117).

The femtocell base station 100 and the base station control equipment 300A establish a control link (in step S118).

The control link is established every BIM card connected to the femtocell base station 100. For example, upon connecting a BIM card A for connection to the communication carrier A and a BIM card B for connection to the communication carrier B to the femtocell base station 100, processing in steps S101 to S118 is established every BIM card, thereby the control link corresponding to the BIM card A and the control link corresponding to the BIM card B are established.

The mobile station 10A periodically transmits and registers the position information of the mobile station 10A to the femtocell base station 100 (in step S119).

The femtocell base station 100 selects the base station control equipment 300 corresponding to the mobile stable 10A (in step S120).

The mobile station 10 and the base station control equipment 300 perform the position registration processing (in step S121).

The position registration processing in steps S119 to S121 may not be performed.

The mobile station 10A transmits the connection request to the femtocell base station 100 (in step S122).

The femtocell base station 100 selects the base station control equipment 300 corresponding to the mobile station 10A (in step S123).

The mobile station 10A and the base station control equipment 300A perform the connection processing (in step S124).

Thus, the femtocell base station 100 can provide communication services through the base station control equipment 300 of the carrier specified by the BIM for the mobile station 10A.

After step S122, upon obtaining the connection request from the mobile station (e.g., mobile station 10A), the femtocell base station 100 obtains the authentication information and the communication carrier information from the mobile station 10A, compares the communication carrier information and the subscriber authentication information obtained from the mobile station 10A with the communication carrier information and the subscriber authentication information of the BIM card information stored in the storage unit 140. When both the information matches each other, the femtocell base station 100 connects the mobile station 10A to the base station control equipment 300A by using a control link established by the BIM card.

Upon receiving the connection request from the mobile station 10 in a state in which a plurality of BIM cards are connected to the femtocell base station 100, the BIM card is specified to match the communication carrier information and the subscriber authentication information transmitted from the mobile station 10 (with the communication carrier information and the subscriber authentication information of the BIM card). The mobile station 10A is connected to the base station control equipment 300A by using the control link established by the specified BIM card.

When the BIM card is connected to the femtocell base station 100, the information on the BIM card is written in the storage unit 140. Therefore, even if detaching the BIM card in the state in which the control link is established between the mobile station 10A and the base station control equipment 300A, the control link is kept.

Next, a description will be given of authentication processing of the femtocell base station 100 that is performed by the base station registration server 200A illustrated in step S104 in FIG. 9A.

Figure 10:
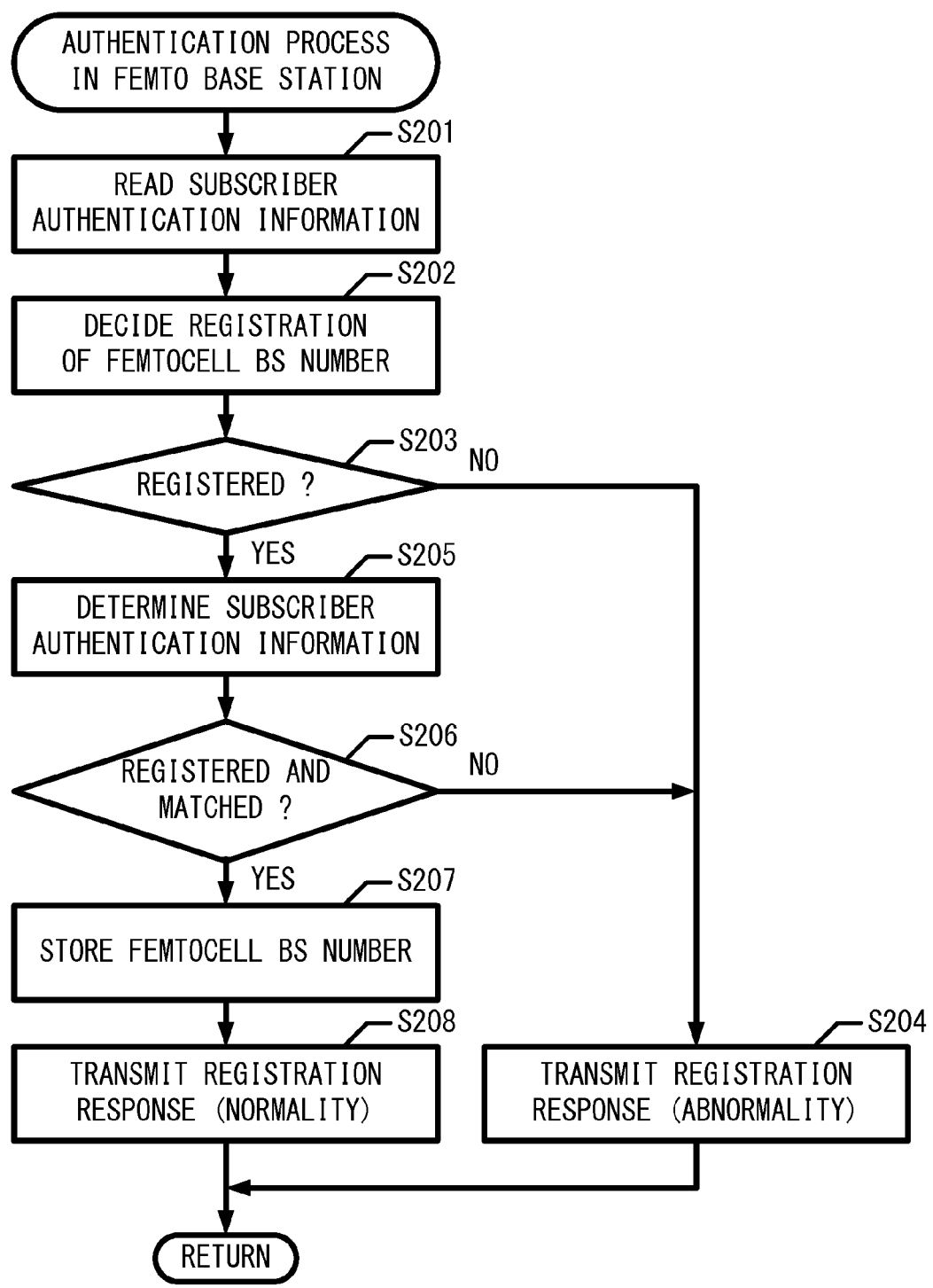
FIG. 10 is a flowchart illustrating authentication processing of the femtocell base station.

FIG. 10 is a flowchart illustrating the authentication processing of the femtocell base station 100.

The base station registration server 200 reads the subscriber authentication information by using the femtocell base station number included in the request for registering the femtocell base station, as key information (in step S201).

The base station registration server 200 determines whether or not the femtocell base station number is registered (whether or not there is a record of the femtocell base station number being the key information) (in step S202).

When the femtocell base station number is not registered ("No" in step S203), the base station registration server 200 transmits a response (abnormality) for registering the femtocell base station (a femtocell base station registration response) to the femtocell base station 100 (in step S204).

When the femtocell base station 100 receives the response (abnormality) for registering the femtocell base station, the request for registering the femtocell base station (the femtocell base station registration request) is transmitted again to the base station registration server 200.

When the femtocell base station number is registered ("Yes" in step S203), the base station registration server 200 determines whether or not the subscriber authentication information is registered and matched to the received information (subscriber authentication information included in the request for registering the femtocell base station) (in step S205).

When the subscriber authentication information is not registered or not matched to the subscriber authentication information ("No" in step S206), the processing shifts to step S204.

On the other hand, when the subscriber authentication information is registered and matched to the subscriber authentication information ("Yes" in step S206), the base station registration server 200 stores the femtocell base station equipment number to the femtocell base station authentication management information 220A (in step S207).

The base station registration server 200A transmits the response (normality) for registering the femtocell base station to the femtocell base station 100 (in step S208). When the femtocell base station 100 receives the response (normality) for registering the femtocell base station, the base station registration server 200 transmits a request for accommodating control equipment (a control equipment accommodation request) to the base station registration server 200A, as illustrated in step S107 in FIG. 9A.

As described above, when the femtocell base station 100 is connected to the detachable BIM card, the communication system according to the embodiment reads information (femtocell base station number and femtocell base station equipment number) for identifying the femtocell base station 100, the subscriber authentication information and the access information to the base station registration server from the BIM card, and issues the request for registering the femtocell base station (the femtocell base station registration request) to the base station registration server 200.

When the femtocell base station 100 receives the response for registering the femtocell base station (the femtocell base station registration response) from the base station registration server 200 and the base station control equipment 300 accommodates the femtocell base station 100, the femtocell base station 100 transmits the request for accommodating the control equipment (the control equipment (BCE) accommodation request) to the base station registration server 200, and receives the response for accommodating the control equipment (the control equipment (BCE) accommodation response). Therefore, the control link between the femtocell base station 100 and the base station control equipment 300 is established.

Thus, the communication apparatus such as the femtocell base station 100 can be separated from the communication carrier, and services of the communication carrier to be used by individual user of the communication apparatus can be provided by using a single communication apparatus.

With the communication system and the communication apparatus according to the embodiment, the communication carrier increase the range of application of the femtocell base station 100, and greatly reduces the capital investment on dedicated networks in the communication carrier.

The access information of the base station registration server (the base station registration server access information) stored in the BIM card is not restricted to the IP address as the destination and a connection application that stores the connection destination may be used for the access information.

Among the processing described above according to the embodiment, all or a part of the automatic processing can be manually performed. Alternatively, all or a part of the manual processing can be automatically performed. In addition, information including the processing sequence, control sequence, name, and various data and parameter indicated in the document and the drawing described above can be arbitrarily changed, except for note.

The components included in the apparatuses (femtocell base station 100, base station registration server 200, and base station control equipment 300) in the drawings are functionally conceptual, and may not be physically structured as illustrated in the drawings.

Various processing sequence as described above according to the embodiment can be realized by executing a prepared program with a computer such as a personal computer or work station.

Figure 11:
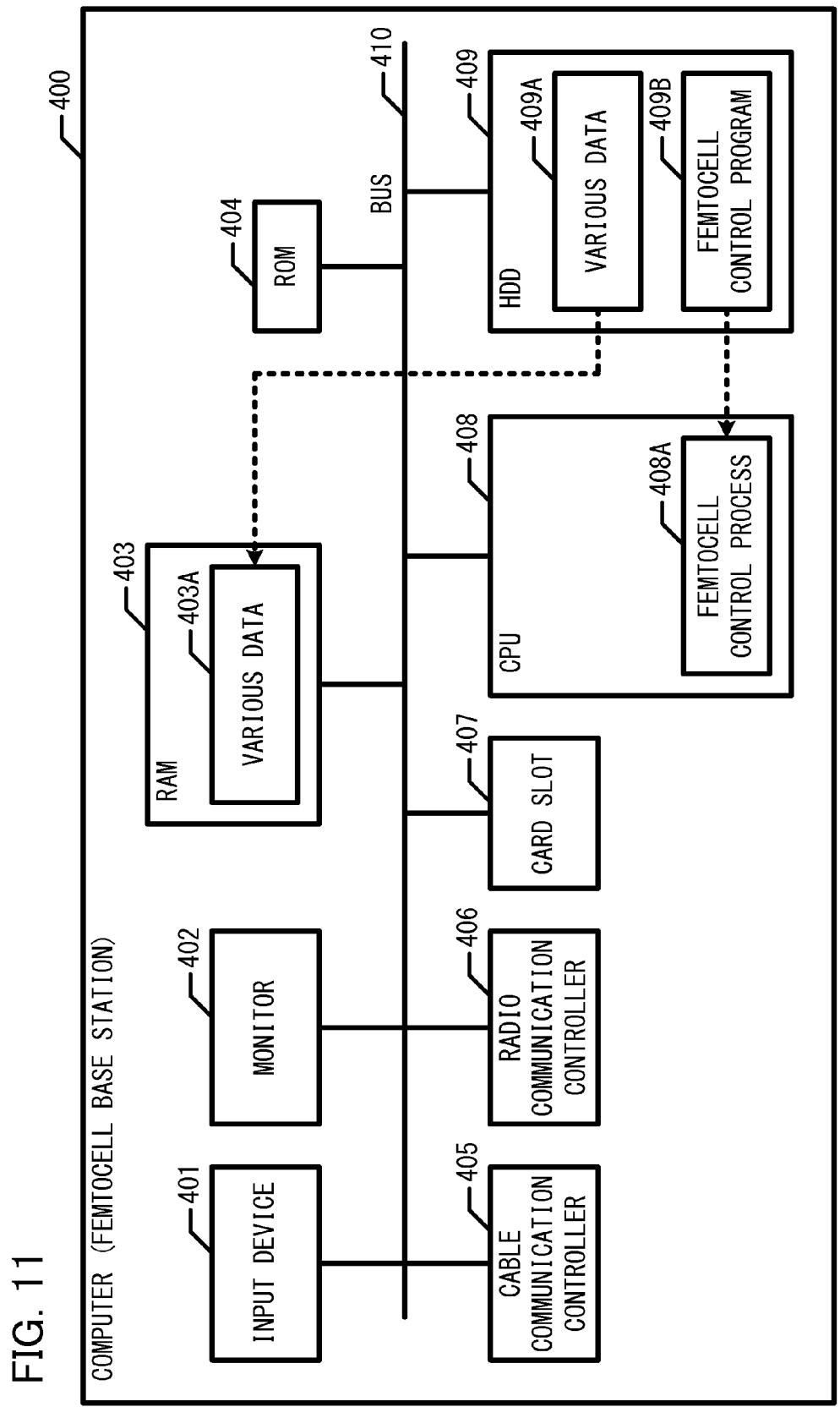
FIG. 11 is a diagram illustrating a hardware structure of a computer forming the femtocell base station.

FIG. 11 is a diagram illustrating the hardware structure of a computer forming the femtocell base station 100. In a computer (femtocell base station) 400, an input device 401, a monitor 402, a RAM (Random Access Memory) 403, a ROM (Read Only Memory) 404, and a cable communication controller 405 for communicating with other devices via an IP network, a radio communication controller 406 for communicating with mobile stations and satellites, a card slot 407 to which the BIM card is inserted, a CPU (Central Processing Unit) 408, and an HDD (Hard Disk Drive) 409 are connected via a bus 410.

The HDD 409 stores a femtocell control program 409B that exhibits the same function as that of the femtocell base station 100. The CPU 408 reads the femtocell control program 409B, thereby a femtocell control process 408A is started.

Herein, a femtocell control process 408A corresponds to the BIM card information reader 150A, the position information calculator 150B, the femtocell base station registration request generator 150C, the control equipment accommodation request generator 150D, and connection controller 150E, illustrated in FIG. 3. The HDD 409 stores various data 409A corresponding to the information stored in the storage unit 140 in the femtocell base station 100. The CPU 408 reads various data 409A stored in the HDD 409, stores the read data in the RAM 403, and performs connection processing to the mobile station and base station control equipment by using various data 403A stored in the RAM 403.

The femtocell control program 409B illustrated in FIG. 11 may not be first stored in the HDD 409. For example, the femtocell control program 409B may be stored in a "mobile physical medium" such as a flexible disk (FD), CD-ROM, DVD, magneto-optical disk, or IC card, inserted to the computer, or a "fixing physical medium" such as a hard disk drive (HDD) equipped for the computer. Furthermore, the femtocell control program 409B may be stored in "another computer (or server)" connected to the computer via a public line, Internet, LAN, or WAN, thereby reading the femtocell control program 409B from the medium and executing the program by the computer.

With the communication apparatus such as the femtocell base station 100, it is possible to provide a communication apparatus and a connection method that can select a core network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A communication apparatus for communicating by radio with mobile stations located in a radio communication area of the communication apparatus and for connecting to a network of a communication carrier from among a plurality of communication carrier networks, the communication apparatus comprising:
   obtainment means for obtaining first information identifying a selection equipment in one communication carrier network from among a plurality of communication carrier networks, wherein the first information is based on data stored in a detachable data storage device relating at least to the one communication carrier network from among the plurality of communication carrier networks, the obtainment means performing said obtaining when the detachable data storage device is connected to the communication apparatus;
   reception means for receiving from the identified selection equipment second information identifying a control equipment in the one communication carrier network, wherein the identified control equipment is selected by the identified selection equipment from a plurality of control equipments when a connection request is received from a mobile station communicating with the communication apparatus, the selection of the control apparatus being based on the obtained first information relating at least to both a position of the communication apparatus and an identification of the one communication carrier network from among the plurality of communication carrier networks; and
   connection means for performing communication by radio to the mobile station with the selected control equipment, based on the received second information identifying the control equipment in the one communication carrier network.

2. The communication apparatus according to claim 1, wherein the data storage device is storing information on a selection equipment for selecting a control equipment.

3. A communication apparatus for communicating by radio with one or more mobile stations located in a radio communication area of the communication apparatus and for connecting to a network of a communication carrier from among a plurality of communication carrier networks, the communication apparatus comprising:
   a controller configured to obtain first information identifying a selection apparatus in one communication carrier network from among a plurality of communication carrier networks, wherein the first information is based on data stored in a detachable data storage unit relating at least to the one communication carrier network from among the plurality of communication carrier networks, wherein the identified selection apparatus selects a controlling apparatus from a plurality of controlling apparatuses in the one communication carrier network, the controller performing said obtaining when the detachable data storage unit is attached to the communication apparatus; and an interface to access to the identified selection apparatus based on the obtained first information and to receive from the identified selection apparatus second information identifying a selected controlling apparatus in the one communication carrier network, wherein the selected controlling apparatus is selected by the identified selection apparatus from a plurality of controlling apparatuses when a connection request is received from a mobile station communicating with the communication apparatus, the selection of the control apparatus being based on the obtained first information relating at least to both a position of the communication apparatus and an identification of the one communication carrier network from among the plurality of communication carrier networks, wherein the controller provides radio communication service to the mobile station using the selected control apparatus, based on the received second information identifying the control apparatus in the one communication carrier network.

4. The communication apparatus according to claim 3, wherein the data storage device is detachable from the communication apparatus and stores information on the selection equipment for selecting the control equipment.

5. A connection method on a communication system comprising a communication apparatus for communicating by radio with mobile stations located in a radio communication area of the communication apparatus and for connecting to a network of a communication carrier from among a plurality of communication carrier networks, a control equipment of a plurality of control equipments within the communication carrier network for connecting to the communication apparatus and a selection equipment within the communication carrier network for selecting the control equipment, the connection method comprising:

reading out first information identifying the selection equipment in one communication carrier network of the plurality of communication carrier networks, wherein the first information is based on data stored in a detachable data storage device relating at least to the one communication carrier network from among the plurality of communication carrier networks, the reading out is performed when the detachable data storage device is connected to the communication apparatus;

selecting, by the identified selection equipment, a control equipment from among a plurality of control equipments when a connection request is received from a mobile station communicating with the communication apparatus, the selection of the control equipment being based on said first information relating at least to both a position of the communication apparatus and an identification of the one communication carrier network from among the plurality of communication carrier networks;

receiving, from the identified selection equipment second information identifying a control equipment from among the plurality of the control equipments in the one communication carrier network; and performing communication by radio to the mobile station with the selected control equipment, based on the received second information identifying the control equipment in the one communication carrier network.

6. The connection method according to claim 5, wherein the selection equipment based on the read out information on the selection equipment performs authenticating a subscriber of the mobile station communicating with the communication apparatus in the selection equipment when the communication apparatus accesses the selection equipment, and the communication apparatus receives information on the control equipment selected from a plurality of control equipments from the selection equipment.

7. The connection method according to claim 5, further comprising:

sending a registration request to the selection equipment based upon the read out information on the selection equipment.

8. The communication apparatus according to claim 3, wherein the detachable data storage unit being attached to the communication apparatus comprises a state allowing communication between the detachable data storage unit and the communication apparatus.

9. The communication apparatus according to claim 8, wherein the detachable data storage unit is an Integrated Circuit that stores information for connecting the terminal to a core network of a communication carrier of the terminal as a subscriber.

10. The communication apparatus according to claim 9, wherein the information for connecting the terminal to the core network is information for accessing a base station registration server of the communication carrier.

11. A communication apparatus for communicating by radio with mobile stations located in a radio communication area of the communication apparatus and for connecting to a network of a communication carrier from among a plurality of communication carrier networks, the communication apparatus comprising:

a processor configured to execute a procedure, the procedure comprising:

obtaining first information identifying a selection equipment in one communication carrier network of the plurality of communication carrier networks, wherein the first information is based on data stored in a detachable data storage device relating at least to the one communication carrier network from among the plurality of communication carrier networks, when the detachable data storage device is attached/connected to the communication apparatus;

selecting, by the identified selection equipment, a control equipment from among a plurality of control equipments when a connection request is received from a mobile station communicating with the communication apparatus, the selection of the control equipment being based on said first information relating at least to both a position of the communication apparatus and an identification of the one communication carrier network from among the plurality of communication carrier networks;

receiving, from the identified selection equipment second information identifying a control equipment from among the plurality of the control equipments in one the communication carrier network; and communicating by radio to the mobile station with the selected control equipment, based on the received second information identifying the control equipment in the one communication carrier network.

* * * * *